June 7, 1927.  1,631,594
E. KAEGI
OIL FILTER
Filed May 24, 1924    2 Sheets-Sheet 1
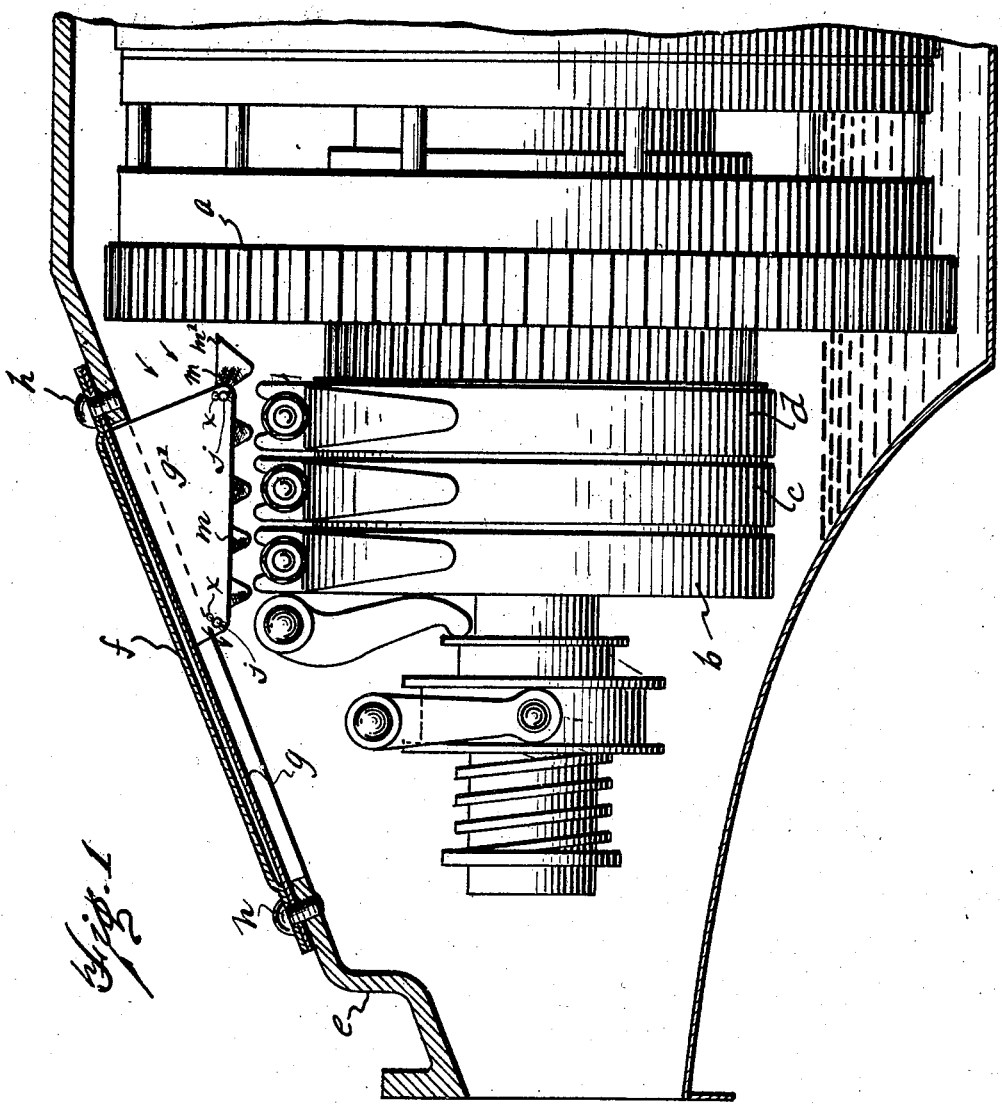
Inventor
Emil Kaegi
By Stuart C. Barnes
Attorney June 7, 1927.  
E. KAEGI  
OIL FILTER  
Filed May 24, 1924  
1,631,594  
2 Sheets-Sheet 2
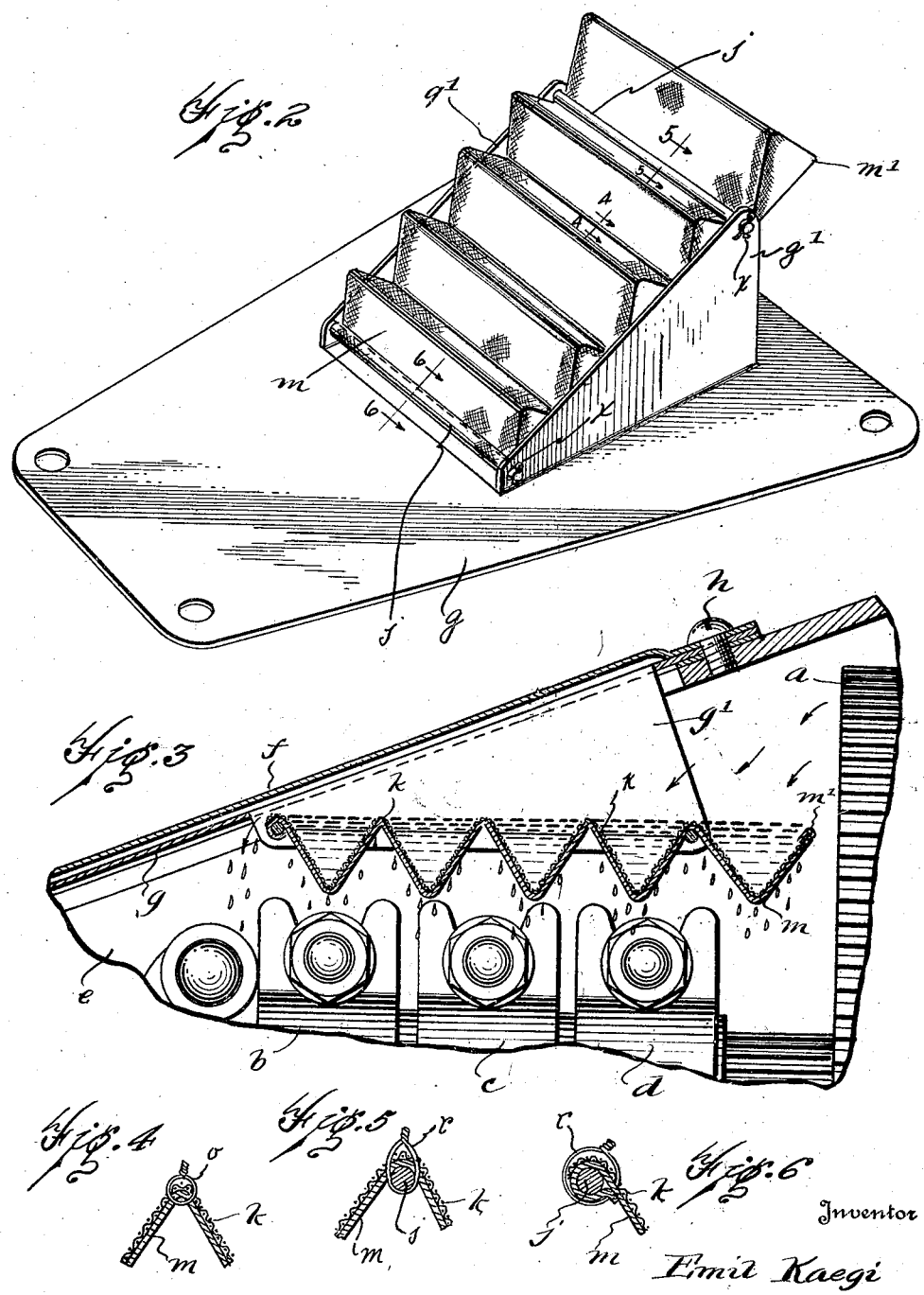
Inventor  
Emil Kaegi  
By Stuart C. Barnes  
Attorney Patented June 7, 1927.

1,631,594

UNITED STATES PATENT OFFICE.

EMIL KAEGI, OF DETROIT, MICHIGAN, ASSIGNOR TO DAWSON J. BURNS, OF BRONXVILLE, NEW YORK.

OIL FILTER.

Application filed May 24, 1924. Serial No. 715,509.

This invention relates to a simple but effective filter for filtering the oil in a machine which depends upon one of the rotating parts for lifting and distributing the oil.

Most automobile engines have a positive oil circulating system which is operated by a pump. However, in the well known Ford car the lifting and distributing of the oil from the bottom of the crank case is performed by the fly wheel.

It is the object of the present invention to provide a simple accessory for a Ford car which will effectively filter the oil and which may be easily installed. It has, of course, a broader application than a Ford car, and hence the claims are more broadly stated.

In the drawings:

Fig. 1 is a vertical section of a Ford transmission with my filtering device installed.

Fig. 2 is a perspective view of the filtering device in inverted position.

Fig. 3 is an enlarged vertical section through the filter and the adjoining parts.

Figs. 4, 5 and 6 are sections on the corresponding sectional lines of Fig. 2.

The well known Ford car has no means for filtering the oil and the result is undue wear takes place on the pistons, cylinder walls and bearings, due to abrasive matter which gets into the oil in some Ford cars rarely ever gets a chance to get out, as the owners are not careful about draining their crank cases. This filtering of the oil is recognized as desirable in most automobile engine construction and in most cars, at least a strainer is provided through which the oil is pumped at every cycle of revolution. However, in the Ford car no provision is made for either straining or filtering the oil. The oil is distributed to the transmission bands and to the oil tray in the crank case in a Ford car by being lifted on the fly wheel which dips in the oil well in the bottom of the transmission case.

Referring to the drawings, $a$ designates the fly wheel, $b$ represents the brake band, $c$ and $d$, the low and reverse transmission bands. The transmission case is designated $e$ and the transmission case cover $f$.

My improvement consists of a plate $g$ of the same dimensions and shape as the transmission cover so that the same may be fitted in under the transmission cover, the screws $h$ serving to secure both the plate and the transmission cover to the case. A pair of downwardly turned wings $g^1$ are struck out of the plate. A pair of tie pins $j$ connect these wings and support the corrugated or zig-zag filtering element which comprises a wire screen $k$ which is bent to form the corrugations or troughs. A piece of filtering cloth $m$ is secured to the bottom of the screen and extends up at the ends of the troughs as shown at $m^1$ in Fig. 1. The wire screen and the filter cloth are tied together with the same wire clips $o$ as shown in Fig. 4, and the filtering cloth and wire screen are tied to the tie pins $j$ by the wire clips $r$, as shown in Figs. 5 and 6.

When the oil is carried up on the fly wheel part of it flies off and drips down over the transmission bands, part of it flies off on the other side and is carried down into the oil tray of the crank case (not shown). Of course, some of the oil is thrown to the front of the fly wheel and is not at the time filtered, but obviously, on some of the subsequent lifting operations the oil particles will be thrown to the back of the fly wheel and fall into the troughs formed by my filter. Before they can escape from the troughs the oil must penetrate the filtering cloth, and thereby the same will be filtered.

The filter may be very easily removed and cleaned at any time the transmission cover is taken off. Inasmuch as the transmission cover is frequently removed to adjust the transmission bands, obviously the filter can be easily reached and cleaned. It will be clear that the device costs little to manufacture and anybody can install it.

It will be noticed that the tie pins are held on the wings by cotter pins $x$. By removing these cotter pins the ties may be taken out and the filtering cloth renewed or a new filtering element put in.

What I claim is:

1. In a vehicle power unit, the combination of a transmission case provided with an oil well, transmission elements and a fly wheel contained within the case, the fly wheel running through the oil well, a cover for the opening in the case, and a filtering unit which can be introduced through said opening and which is provided with a suspended filtering element supported near the top of the fly wheel, said filtering element being disposed substantially horizontally, whereby the oil passing therethrough is distributed over each transmission band.

2. In a vehicle power unit, the combination of a transmission case, a plurality of transmission elements including transmission bands and a fly wheel running in an oil well all contained within the transmission case, and a filtering unit removably supported in the transmission case, and comprising a plurality of filtering portions arranged each to drip the filtered oil over the transmission bands.

3. In a vehicle power unit, the combination of a transmission case provided with an opening in the top and provided at the bottom with an oil well, transmission elements including transmission bands located in the case, a fly wheel running through the oil well, a cover for the opening in the case, and a filtering unit introduced through the opening in the case and which can be removably supported in the transmission case, said filtering unit comprising a member having a zig-zag like bottom to form a plural trough filtering screen in which the filtered oil is directed from the troughs directly over the transmission bands.

4. In a vehicle power unit, the combination of a transmission case provided with an opening in the top and provided in the bottom with an oil well, transmission elements including transmission bands contained within the case, a fly wheel running through the oil well in the case, a cover for the opening in the case, and a filtering unit including a plate that can be supported over the opening in the case and under the cover plate, and provided with a suspended filtering element having a plurality of troughs through which the oil passes so that the oil is distributed over the transmission bands.

In testimony whereof I have affixed my signature.

EMIL KAEGI.